United States Patent [19]

Austin et al.

[11] 4,170,765

[45] Oct. 9, 1979

[54] LIQUID LEVEL SENSOR

[75] Inventors: James W. Austin, Melbourne Beach; Oscar L. Morris, Fort Walton Beach; Michael E. Rothrock, Melbourne, all of Fla.

[73] Assignee: Marvtek, Corporation, Satellite Beach, Fla.

[21] Appl. No.: 818,192

[22] Filed: Jul. 22, 1977

Related U.S. Application Data

[63] Continuation-in-part of Ser. No. 568,852, Apr. 17, 1975, abandoned.

[51] Int. Cl.$^2$ .................... G01S 9/68; G01F 23/00
[52] U.S. Cl. ........................., 367/100; 73/290 V; 367/108; 367/908
[58] Field of Search ............ 340/1 L; 73/290 V

[56] References Cited

U.S. PATENT DOCUMENTS

| | | | |
|---|---|---|---|
| 2,713,263 | 7/1955 | Turner | 73/290 V |
| 2,753,542 | 7/1956 | Rod et al. | 340/1 L |
| 2,787,160 | 4/1957 | Van Valkenburg | 73/290 V |
| 3,184,969 | 5/1965 | Bolton | 73/290 V |
| 3,394,589 | 7/1968 | Tomioka | 73/290 V |
| 3,486,368 | 12/1969 | Brech | 340/1 R X |

Primary Examiner—Richard A. Farley
Attorney, Agent, or Firm—Gipple & Hale

[57] ABSTRACT

A method and apparatus for indicating the level of liquid in a tank or the like whereby a transducer is mounted on a pipe above the liquid for producing, in response to a trigger signal, an ultrasonic pulse which is transmitted toward and reflected to the transducer first from a calibration target in the pipe above the liquid and then from the liquid so that the transducer produces echo pulses in response to receipt thereof. In one embodiment the calibration echo signal is applied to a logic circuit together with the output of a counter which is incremented to a predetermined count following the trigger signal by pulses from a voltage controlled oscillator so that the logic produces a control signal indicating the difference in time between when the calibration echo is received and when the counter reaches its predetermined count and which event occurs first. The logic then varies the frequency of the oscillator to reduce the difference. A further counter is enabled upon receipt of the calibration echo signal to accumulate a count of pulses from the oscillator and disabled upon receipt of the liquid echo signal so that the count indicates the liquid level.

24 Claims, 4 Drawing Figures

LIQUID LEVEL SENSOR

This is a continuation-in-part application from abandon application Ser. No. 568,852 filed Apr. 17, 1975 entitled LIQUID LEVEL SENSORS.

The invention relates to the method and apparatus for providing an output indication of the level of liquid in a tank or the like.

Many situations exist in which it is desirable to accurately determine and display the level of a liquid, for example, chemicals stored in a tank, water stored in reservoirs or the level of water in canals, rivers and the like. Often the environment may be corrosive and even explosive.

A variety of devices for determining such levels are in wide spread use. Many of these involve floats or the like which operate switches which are in turn connected to circuits to provide an output display. In another type of device, the level is determined by directing ultrasonic or other radiation from a transducer at a fixed location above the surface to the liquid surface and measuring the time it takes the echo to return from the surface to the transducer or to another pick up device. The patents to Welkowitz U.S. Pat. Nos. 3,100,885 and Rod et al. 2,775,748 are typical of these types of devices.

One problem with this type of echo detecting apparatus is that the time that it takes the signal to be sent out and to return is a function of environmental conditions, including the ambient temperature, humidity and pressure of the gaseous medium above the liquid. However, these variations can be compensated, as described in Welkowitz, by providing a separate transducer which transmits echoes over a second fixed path. In the Welkowitz arrangement this fixed path is to the opposite side of the container and back.

This present invention relates to a method and apparatus of this general type in which an ultrasonic signal produced by a transducer is directed to a liquid whose level is to be measured and the echo returning from the liquid surface detected to produce a signal which indicates the level of the liquid. There are no moving parts and the sensor does not contact the liquid being monitored so that it can be used in extreme environmental conditions, even where the conditions are explosive. Continuous calibration automatically compensates for ambient changes of temperature, humidity and pressure of the gaseous medium above the liquid. This calibration is accomplished by detecting the echo from a reference point along the path between the transducer and the liquid.

A single acoustic pulse is transmitted, preferably along a tube, to the surface of the liquid. A reflection target, such as a discontinuity in the tube between the point of transmission and the liquid surface, provides an echo signal which arrives before the signal from the liquid surface. This is a simple, inexpensive and accurate way to provide a calibration signal.

More particularly, as described below, in one embodiment the transmit pulse is provided by a pulse generator which includes an astable multivibrator which produces pulses having a period greater than the greatest time required for the transmitted pulse to be reflected from the liquid. The astable multivibrator is triggered by a voltage controlled oscillator operating at a much higher frequency. The calibration echo pulse and the subsequently received echo pulse from the liquid are passed by a pair of threshold detector circuits to a respective blanking circuit. The blanking circuit to which the calibration echo signal is applied was triggered by the initial transmit pulse to block transmission of any signals for a short period thereafter and prevent spurious signals triggering the apparatus. The calibration echo signal, when it arrives, is passed to a logic circuit which also receives an input from a divider circuit coupled to the voltage controlled oscillator and which counts to a predetermined count, for example 400, before applying a signal to the logic circuit.

The logic circuit determines whether the calibration echo signal or the signal from the divider arrives first and provides an output indicating the time difference between when the two signals arrive. This time difference indicates the variation in frequency and the direction of variation for the voltage controlled oscillator to automatically and correctly calibrate the circuit. The logic circuit is connected to the voltage controlled oscillator via a ramp and hold circuitry which varies the input voltage to the oscillator accordingly.

The signal from the liquid which arrives subsequent to the calibration echo, passes through the liquid blanking circuit which, similar to the blanking circuit for a calibration echo, prevents spurious noise or the echo signal from the target from passing and deactivates a counter which was previously activated by the calibration echo signal and thus has accumulated a count which is a function of the time between the receipt of the calibration echo signal and the liquid echo signal. The output of this counter is then applied to a conventional display.

Many other objects and purposes of the invention will be clear from the following detailed description of the drawings.

DETAILED DESCRIPTION OF THE DRAWINGS

Figure 1:
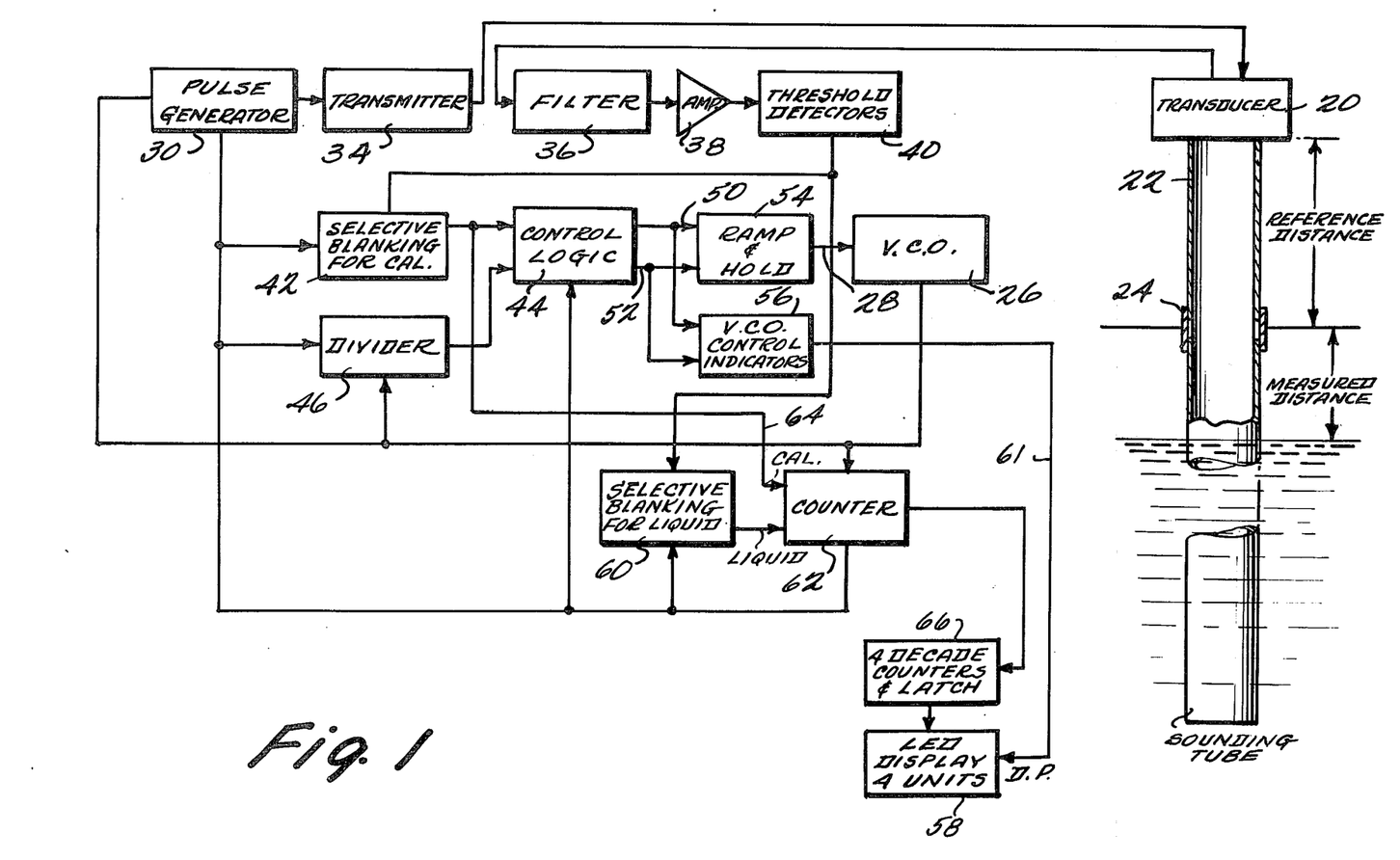
FIG. 1 shows a block diagram of the unique apparatus and system of this invention.

Reference is now made to FIG. 1 which illustrates a block diagram of the unique invention of this application. A conventional transducer 20, which may for example be a phenolic cone, super tweeter, is mounted on the top of sounding tube 22, which may be a one-half inch galvanized pipe, by any suitable means, for example a threaded barrel coupling. Pipe 22 is cut into two portions with the connection between them forming a calibration target 24. The small discontinuity at the joint acts as a partial reflector.

In the preferred embodiment, the calibration target 24 is constructed so as to allow expansion of a pulse which emanates from the transducer. The echo signal thus produced by the calibration target, due to the expansion of a pulse, will exhibit an easily detectable reverse wave shape with respect to the echo signal received from the liquid sought to be measured. The fact that a reverse wave shape is formed by the transducer's signal passing by the calibration target, which target provides for expansion of the pulse, substantially facilitates calibration of the liquid level sensor, as it is easier to detect a reverse wave than a modified originating wave.

The present invention provides a void or discontinuity in the sounding tube as the calibration target. The void or discontinuity, as contrasted with the prior art calibration targets, is crucial in that the voids provide a reverse wave shape which, as mentioned, is easier to detect and substantially facilitates calibration of the system.

Tube 22 provides a suitable distance from the transmit point of transducer 20 to the calibration target 24 within the sounding pipe 22. A four foot distance has been found to be satisfactory and enough threading is preferably provided to allow adjustment to compensate for differences in transducers and minor differences in the calibration pipe lengths. Alternately, calibration target 24 may be any type of device which will provide a suitable reverse wave shape calibration echo in response to the transmitted ultrasonic pulse from transducer 20.

Voltage controlled oscillator 26 provides an output train of pulses having a frequency which is varied as a function of the input voltage on line 28. The output train of pulses from oscillator 26 is applied to a pulse generator 30 which produces a synchronized train of pulses having a period which is greater than the maximum time required for the transmitted pulse to return to the transducer from the liquid surface and which is many times the period of the pulses from oscillator 26. The pulses from the pulse generator 30 are applied to transducer 20 by transmitter circuit 34.

The calibration echo signal and the subsequently received liquid echo signal are detected by transducer 20 and applied to a frequency discriminator circuit 36 which functions to remove unwanted high frequency noise and low frequency ripple harmonic components in the return signals. The output of discriminator circuit 36 is amplified by conventional amplifier 38 and applied to a pair of threshold detectors 40 which separate the calibration echo and liquid echo signals.

The calibration echo signal is applied as one input to a selective blanking circuit 42 which is also connected to pulse generator 30. Upon production of a trigger pulse from generator 30 which causes transducer 20 to produce a transmit pulse, selective blanking circuit 42 is triggered for a time sufficient to block the transmitted pulse and noise associated therewith but which returns to its initial condition before the echo returns from target 24. Accordingly, circuit 42 passes the calibration echo signal to logic circuit 44.

Divider circuit 46 is also connected to oscillator 26 to provide an output to logic 44 on line 48 after a predetermined number of output pulses from oscillator 26, for example, 400 pulses have been accumulated. This number of pulses represents the distance between the transducer 20 and the calibration target 24. If the calibration echo signal arrives before divider 46 has reached its predetermined count, then voltage controlled oscillator 26 must be speeded up until the predetermined count is reached at the same time that the calibration echo signal is received. Logic 44 in this situation produces an output signal on the ramp output line 50 indicating the time between when the calibration echo signal is applied to logic 44 and when the divider 46 reaches its predetermined count. Similarly, when counter 46 counts to its predetermined count, before the calibration echo signal is received, the voltage controlled oscillator 26 must be slowed down and logic 44 produces a suitable output signal on line 52.

Lines 50 and 52 are connected to a ramp and hold circuit 54 which produces a voltage output on line 28 varying the output frequency of voltage controlled oscillator 26. Further, lines 50 and 52 are connected to the voltage controlled oscillator control indicators 56 which connect to the led displays 58 by line 61 to indicate whether the calibration is within acceptable limits.

The output of threshold detectors 40 is also applied to a second selective blanking circuit 60 which is similarly triggered by pulse generator 30 and which blocks transmission of any signal for a time which is sufficient for the calibration echo signal to be received. When, thereafter, the liquid echo signal is received, it is passed by blanking circuit 60 to disable counter 62 which has been previously activated by the calibration echo signal applied to counter 62 on line 64. When activated, counter 62 receives the output pulses of oscillator 26 to accumulate a count which indicates the liquid level. The output of counter 62 is applied to a latch circuit 66 which in turn is coupled to LED display 58.

Other techniques can, of course, be used to provide calibration, although the arrangement described herein has been found to be particularly satisfactory. Digital storage techniques may be more desirable than frequency sweeping in many circumstances.

Figure 2:
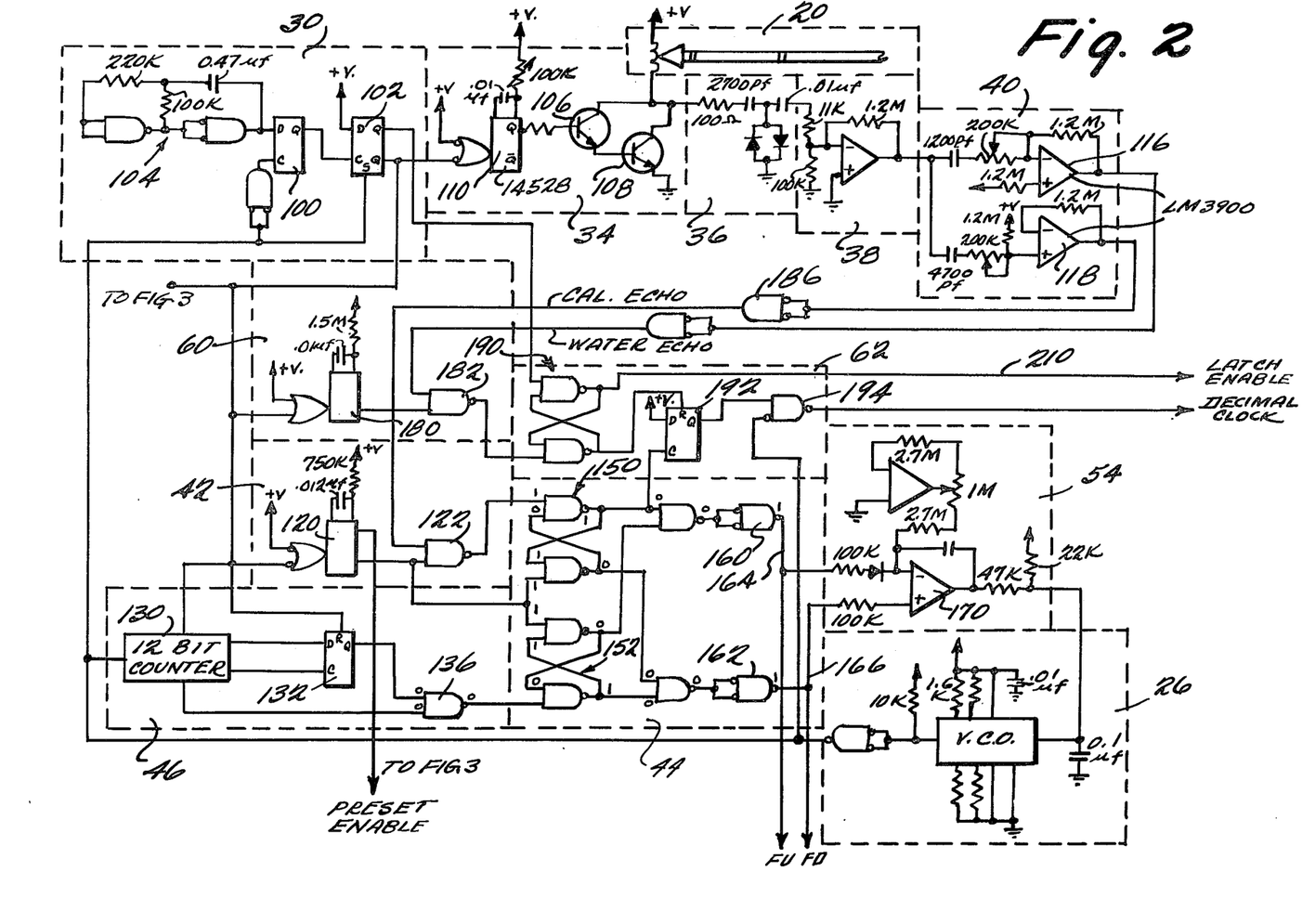
FIGS. 2 and 3 illustrate the detailed schematic for the circuitry illustrated in block diagram in FIG. 1.
Figure 3:
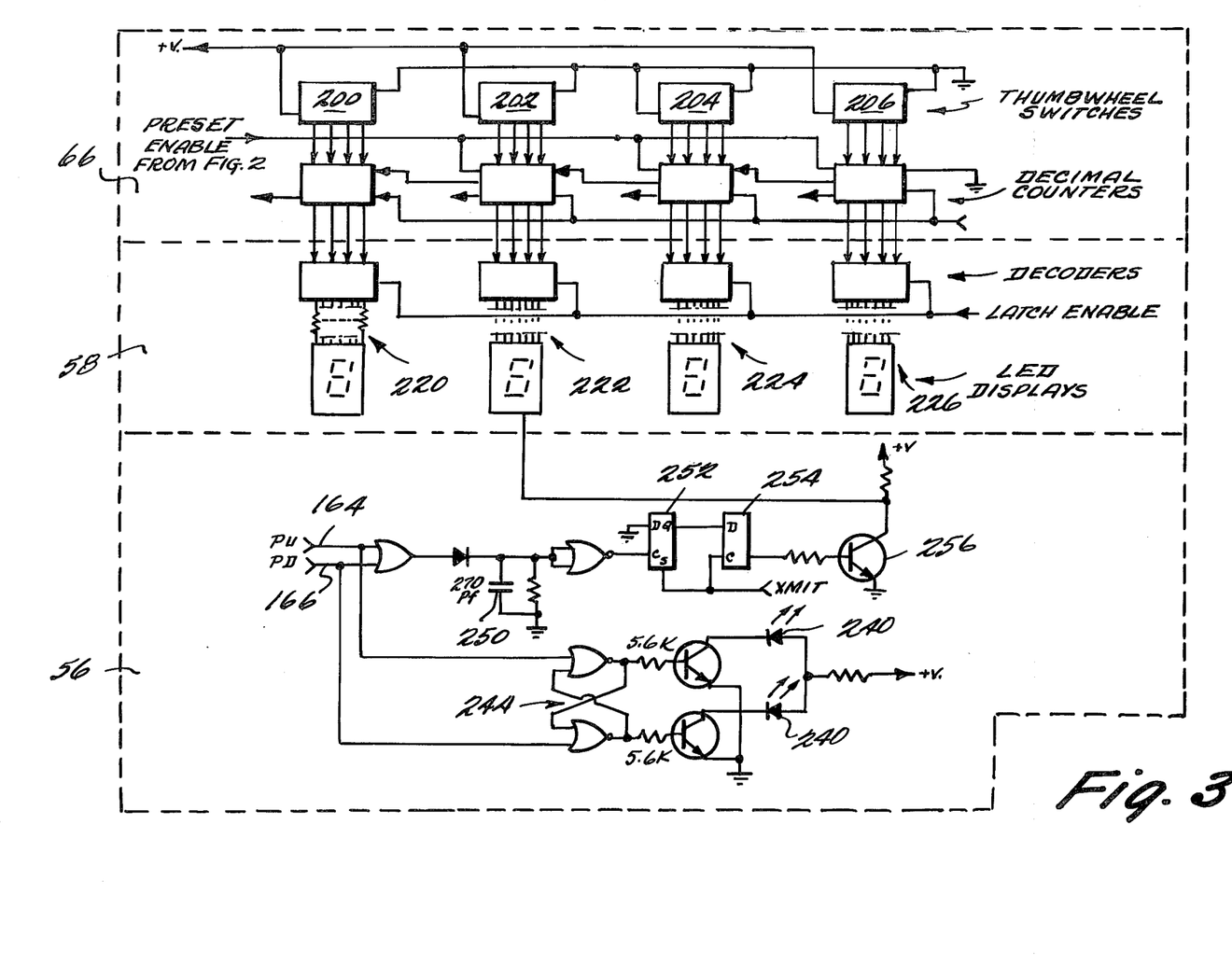

Reference is now made to FIGS. 2 and 3 which illustrate in detail the unique circuitry of FIG. 1. Pulse generator 30 includes two D-type flip-flops 100 and 102 together with a conventional astable multivibrator 104. Astable multivibrator 104 preferably has a frequency of about 1.5Hz. Flip-flops 102 and 104 are connected to the output of conventional voltage controlled oscillator 26, which may, for example, be an Intersil 8038 waveform generator to synchronize the output of generator 30 with the output of oscillator 26 for accurate counting. This particular generator is provided with timing components and biased to provide a nominal square wave output frequency of 600 KHz. Flip-flop 102 functions as a buffer driver which is set on the leading edge of the output pulse from flip-flop 100 and reset by the next pulse from voltage controlled oscillator 26. The output of generator 30 thus has a pulse width equal to the time between clock pulses from the voltage controlled oscillator 26.

Generator 30 is connected to transmitter circuit 34 which includes a pair of Darlington connected transistors 106 and 108 which are driven by an adjustable one-shot multivibrator 110. Multivibrator 110 receives the transmit pulse from generator 30 and the output pulse of the Darlington connected transistors 106 and 108 drives conventional transducer 20.

Transducer 20 is also connected to a frequency discriminator circuit 36 which comprises a passive filter network which discriminates against unwanted high frequency noise and low frequency ripple harmonic components of the echoes detected by transducer 20. The return echo pulses received by transducer 20 are amplified by conventional amplifier 38 and applied to a pair of threshold detectors 40. Threshold detectors 40 include operational amplifiers 116 and 118 together with the associated passive elements which are chosen to have parameters appropriate for passing the calibration echo and liquid echo signals respectively. Both the calibration echo signal and the subsequently received liquid echo signal are applied to selective blanking circuit 42 although operational amplifier 116 and particularly the passive elements associated with it have been chosen to favor the calibration echo signal.

Figure 4:
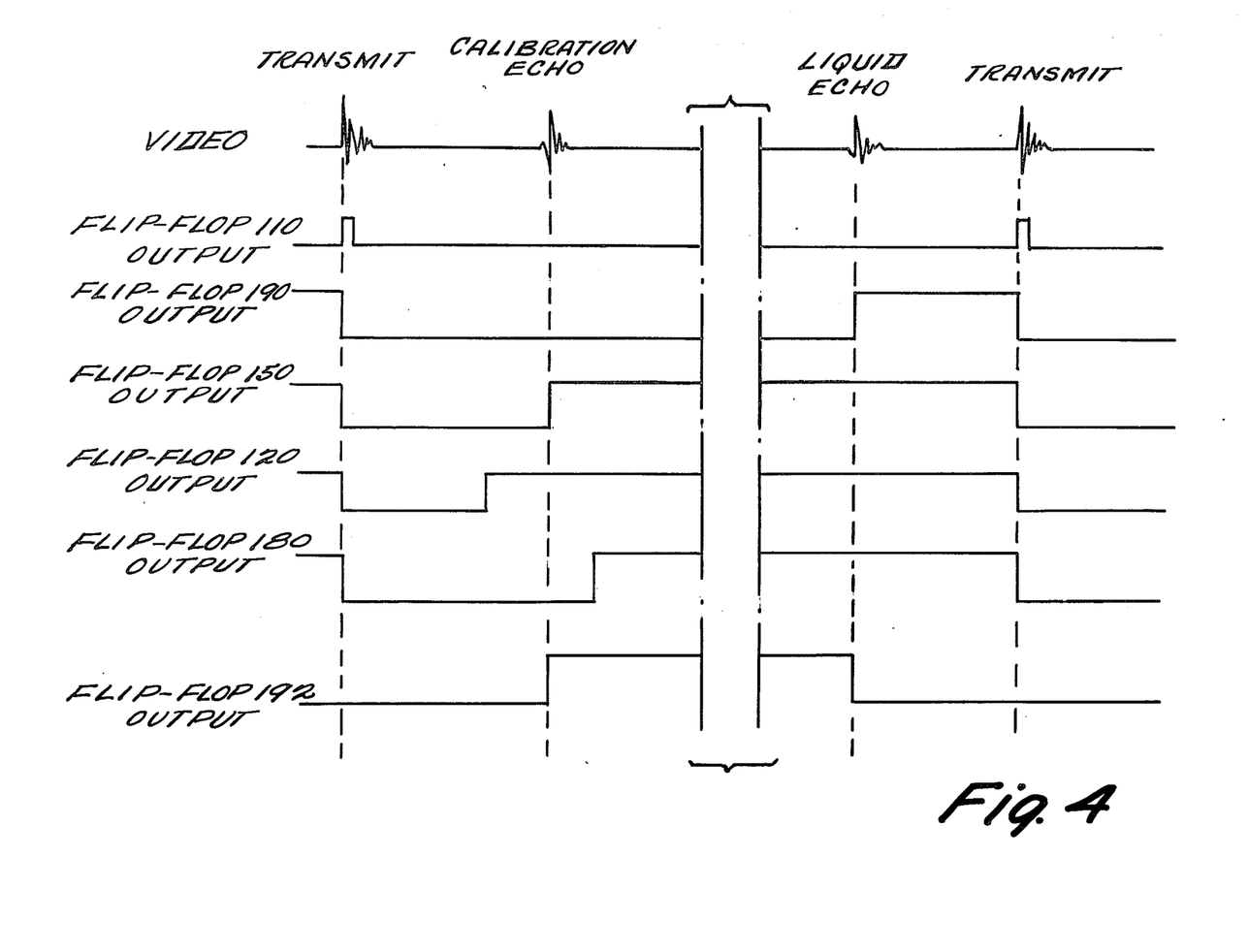
FIG. 4 shows the timing diagram for the circuitry of FIGS. 1–3.

Calibration selective blanking circuit 42 includes a one-shot multivibrator 120 with its output connected to NAND gate 122. The output of pulse generator 30 and particularly the output of flip-flop 102 is connected to the input to one-shot multivibrator 120 for triggering the one-shot from the high to the low output condition when flip-flop 102 produces its trigger pulse, as can be seen in FIG. 4. The low output of one-shot multivibrator 120 blocks NAND gate 122, preventing any input from being passed therethrough until the output of one-shot multivibrator 120 returns to its high condition. The duration of the output pulse of multivibrator 120 is chosen to be less than the time which it will take for the calibration echo to return to the transducer 20 so that the blanking circuit 42 functions to prevent an erroneous triggering of the circuit by the transmit pulses or any noise which results immediately thereafter. The output of generator 30 and more particularly the pulse produced by flip-flop 102 is also applied to the reset input of a conventional 12-bit counter 130 which forms part of divider circuit 46. Counter 130, after being reset, begins counting pulses from oscillator 26 to a predetermined number, for example 400, and upon reaching that number triggers D-type flip-flop 132 which was also reset by the transmit pulse produced by flip-flop 102.

The output of flip-flop 132 is applied to logic circuit 44 by NAND gate 136. Logic circuit 44 thus receives a pulse from NAND gate 122 when the echo signal arrives from calibration target 24 and a pulse from NAND gate 136 when a predetermined number of pulses from voltage controlled oscillator 26 have accumulated in counter 130. Logic circuit 44 then functions to indicate which of these two signals is received first and the time between receipt of the two signals so that voltage controlled oscillator 26 can be adjusted to automatically calibrate the apparatus by changing the frequency of its output pulse train until the time that it takes for the transmitted pulse to be reflected from calibration target 24 is equal to the time that it takes to accumulate 400 pulses from voltage controlled oscillator 26 in 12-bit counter 130. Logic 44 includes flip-flops 150 and 152 each comprised of a pair of conventionally interconnected NAND gates and each reset by the leading edge of the pulse from multivibrator 120. Flip-flop 150 shifts its output condition when a pulse is received from NAND gate 122 indicating reception of a calibration echo signal while flip-flop 152 shifts its output condition when a pulse is received from NAND gate 136 indicating that a count of 400 or some other predetermined number has been accumulated in counter 130.

When one-shot multivibrator 120 shifts to its low condition as illustrated in FIG. 4 in response to a transmitted pulse from generator 30, a low signal is applied to the inputs to flip-flops 150 and 152 which both shift their logic output conditions so that the outputs of inverter gates 160 and 162 on lines 164 and 166 respectively are both low. If logic circuit 44 next receives the pulse echo signals so that a pulse is applied to flip-flop 152 from NAND gate 122, the output of gate 160 shifts to a high output condition while the output of gate 162 remains low.

Lines 164 and 166 are connected to the negative and positive inputs, respectively, of operational amplifier 170 which forms part of the ramp and hold circuit 54. Since the negative input now exceeds the positive input, differential amplifier 170 provides a negative voltage signal to the voltage controlled oscillator 26 which causes the frequency of the output pulses to increase and automatically calibrate the system. When the pulse from NAND gate 136 arrives, flip-flop 152 similarly shifts to a high output condition on line 166 balancing the inputs to differential amplifier 170 and terminating the shift in the voltage controlling input to oscillator 26.

Similarly should the pulse from NAND gate 136 arrive first, flip-flop 152 shifts its output condition to produce a high output on lines 166 which produces a positive input signal to cause the frequency of the pulse train produced by oscillator 226 to be lowered. In this fashion the system is automatically calibrated.

Subsequent to receipt of the calibration echo signal, the echo signal from the liquid will be received and applied to both the selective blanking circuit 42 and the liquid selective blanking circuit 60 which, like circuit 42, includes a one-shot multivibrator 180 which is triggered by the output of flip-flop 102 and which is coupled to NAND gate 182. The pulse passed by gate 122 will have no effect on flip flop 150 whose output state can be changed only by a new pulse from multivibrator 120. The other input to NAND gate 182 is connected to the output of differential amplifier 116 via inverter 186. As can be seen in FIG. 4, the output duration of the pulse produced by one-shot multivibrator 180, which blocks NAND gate 182, is chosen to be greater than the time required for the calibration echo signal to be received. Accordingly, by the time that the liquid echo signal is received, gate 182 has been enabled to pass the liquid echo signal to the count control circuit 62 which includes a pair of NAND gates 190 forming a flip-flop and connected to flip-flop 192 which is clocked at the time of receipt of the calibration echo signal by the output of flip-flop 150 and is reset at the time of receipt of the liquid echo signal. The output of flip-flop 192 is connected to NAND gate 194 which thus passes pulses from the voltage controlled oscillator 26 to the decade counter which is illustrated in FIG. 3.

Referring particularly to FIG. 3, circuit 66 consists of four cascaded pre-settable decade counters 200, 202, 204 and 206. The preset enable for the parallel entry from wheel data is the transmitting blanking pulse from flip-flop 120 in the blanking circuit 42. The decade counters are allowed to count between the time that the calibration echo signal is received and the time that the liquid echo signal is received by the gated decimal clock provided by oscillator 26. The decade counter stops counting when the liquid echo signal is received and the resulting data is dumped into the latches by the latch enable pulse provided by the output of flip-flop 190 on line 210. The thumb wheels are used to preset the decade counter to the number of counts representing the distance from the calibration target to the water level and/or wired in a count-down configuration. A number of count pulses represents accordingly the distance from the calibration target to the surface of the water and the resultant display thus represents the water height instead of the distance from the transducer to the water. The latches may comprise combinational BCD to 7 segment decoders and latches plus 7 segment display drivers.

The LED display 58 consists of four segment displays for example the Monsanto MAN74 seven segment displays 220, 222, 224 and 226 which are driven by the seven segment decoder latches of circuit 66.

Control indicators 56 provide means for adjusting the control voltage to the voltage controlled oscillator phaselock loop without an oscilloscope to observe the raise frequency and lower frequency inputs to the ramp and hold circuit 54. LEDs 240 and 242 are connected by flip-flop 244 of the ramp and hold lines 164 and lines 164 and 166 to indicate switching of the raise and lower command pulses. The respective LEDs are latched by flip-flop 244 for the duration of the output pulse from pulse generator 30. The decimal point in the display output is used to indicate that the voltage controlled oscillator is locked within the margin of acceptable operation. The pulse widths of the lower frequency and raise frequency command pulses are monitored continuously by charging capacitor 260 which triggers flip-flops 252 and 254 which in turn operate transistor 256. If these pulse widths become too long, then the decimal point turns off at the time of the transmit pulse from generator 30 which is coupled to flip-flops 252 and 254.

Many changes and modifications in the above described invention, of course, can be carried out without departing from the scope thereof. Accordingly, that scope is intended to be limited only by the scope of the appended claims.

What is claimed is:

1. An apparatus for providing an output indicating the level of liquid comprising:
   a transducer for producing in response to a trigger signal, a pulse which is transmitted toward the liquid and producing, in response to receipt of an echo signal, an electrical signal,
   a calibration target for producing a first echo signal in response to receipt of pulse from said transducer,
   means for mounting said transducer above said liquid with said target disposed between said transducer and said liquid at a fixed distance from said transducer so that said tranducer receives a first signal from said target before a second echo signal is received from said liquid, said calibration target being constructed so as to allow expansion of said pulse from said transducer so that the first echo signal produced has a reverse wave shape from the second echo signal received from said liquid.
   circuit means for receiving the second echo signal from said liquid surface and said trigger signal producing an output signal indicating liquid level which varies as a function of the time between receipt of the trigger signal and receipt of the first and second echo signals from the calibration target and the liquid surface,
   means connected to said transducer for producing said trigger signal and applying the produced trigger signal to said transducer,
   comparator means for receiving the first and second echo signals and the trigger signal from said trigger signal producing means, comparing the time between receipt of the trigger signal and receipt of the first and second echo signals with a predetermined time and producing a calibration correction signal indicating the magnitude and direction of the difference.
   means for applying said calibration correction signal to said circuit means to vary the output signal thereof, and
   a counting means and means for enabling said counting means upon receipt of said echo signal from said target and disabling said counting means upon receipt of said echo signal from said liquid so that the count indicates the level of said liquid.

2. An apparatus as in claim 1 wherein said mounting means includes a sounding tube extending into said liquid and with said transducer mounted at the end thereof above said liquid, and said sounding tube defining a discontinuity therein to form said target.

3. An apparatus as in claim 1 wherein said trigger signal producing means includes a pulse generator connected to said circuit means for producing a train of trigger pulses synchronized with the pulses from said circuit means, and further including further circuit means for producing a train of electrical pulses at a variable controlled frequency, and wherein said applying means varies the frequency of said pulse train to reduce the magnitude of said correction signal.

4. An apparatus as in claim 3 wherein said pulse generator includes an astable multivibrator and first and second flip-flops connected to said astable multivibrator and to said circuit means for passing a pulse from said astable multivibrator when said further circuit means is producing a pulse.

5. An apparatus as in claim 3 further including a transmitter circuit comprising a serially connected one shot multivibrator and a pair of Darlington connected transistors connected between said pulse generator and said transducer.

6. An apparatus as in claim 1 wherein said comparator means includes a logic circuit having first and second inputs and first and second outputs, blanking means connecting the received echo signal from said target to one of said inputs, a counter for producing an output signal upon counting a predetermined count, means for connecting said circuit means to said counter and to said trigger signal producing means for applying said pulses from said circuit means to said counter after said trigger signal is produced, means for connecting the output of said counter to the other of said inputs calibration signal correcting means, said logic means being reset by said trigger signal, shifting to a given output condition at said first output after said counter produces said output signal and shifting to a given condition at said second output after an echo signal is received from said target.

7. An apparatus as in claim 6 wherein said calibration signal correcting means includes a differential amplifier having one input connected to one of said logic circuit outputs and the other input connected to the other of said logic circuit outputs for producing said correction signal and wherein said circuit means includes a voltage controlled oscillator connected to the output of said differential amplifier.

8. An apparatus as in claim 7 wherein said enabling and disabling means includes a blanking circuit connected to said trigger signal producing means and to said transducer for receiving echo signals and blocking passage thereof for a predetermined time following said trigger signal greater than the time for said echo signal to be received from said target, first flip-flop means connected to said trigger signal producing means and to said blanking circuit for shifting from a first to a second output condition when said trigger signal is received and from said second to said first condition when an echo signal is passed by said blanking circuit, a second flip-flop connected to the output of said first flip-flop and to said logic means for shifting from a first to a second output condition when said first flip-flop shifts from said first to second condition and from said second to said first condition when said logic circuit produces said given output condition at said second output, and gate means connected to the output of said second flip-flop and to the output of said circuit means for passing pulses from said circuit means while said second flip-flop is in said first condition.

9. Apparatus as in claim 8 further including a second blanking circuit connected to said trigger signal producing means, to said transducer and to said logic circuit for receiving echo signals and blocking passage thereof to said logic circuit for a predetermined time following said trigger signal less than the time for said echo signal to be received from said target.

10. Apparatus as in claim 9 further including a serially connected filter circuit, amplifier circuit and threshold detector circuit connected between said blanking circuits and said transducer.

11. Apparatus as in claim 10 wherein each said blanking circuit includes a one shot multivibrator connected to said trigger signal producing means for producing a pulse in response to said trigger signal and gate means connected to said one shot multivibrator and to said threshold detector circuit for blocking passage of an echo signal while said one shot multivibrator is producing a pulse.

12. A circuit for providing an indication of the level of liquid from a trigger signal which causes an acoustical pulse to be transmitted toward the liquid surface and reflected from a target a fixed distance from the point of transmission and the surface to produce a calibration echo signal from the target and a subsequent liquid echo signal from the liquid surface comprising:
circuit means for producing a train of electrical pulses at a variable controlled frequency,
means connected to said circuit means for counting said pulses from said circuit means,
comparator means for receiving the calibration echo signal and the trigger signal and comparing the time between receipt of the trigger signal and receipt of the calibration echo signal with a predetermined time and producing a calibration correction signal indicating the magnitude and direction of the difference,
said comparator means comprising a logic circuit having first and second inputs and first and second outputs, blanking means connecting the received echo signal from said target to one of said inputs, a counter for producing an output signal upon counting a predetermined count, means for connecting said circuit means to said counter and to said trigger signal producing means for applying said pulses from said circuit means to said counter after said trigger signal is produced, means for connecting the output of said counter to the other of said inputs said logic means being reset by said trigger signal, shifting to a given output condition at said first output after said counter produces said output signal and shifting to a given condition at said second output after echo signal is received from said target,
means for applying said calibration correction signal to said pulse train producing means to vary the frequency of said pulse train to reduce the magnitude of said correction signal, and
a counting means and,
means for enabling said counting means upon receipt of said echo signal from said target and disabling said counting means upon receipt of said echo signal from said liquid so that the count indicates the level of said liquid.

13. A circuit as in claim 12 wherein said calibration signal correcting means includes a differential amplifier having one input connected to one of said logic circuit outputs and the other input connected to the other of said logic circuit outputs for producing said correction signal and wherein said circuit means includes a voltage controlled oscillator connected to the output of said differential amplifier.

14. A circuit as in claim 13 wherein said enabling and disabling means includes a blanking circuit connected to said trigger signal producing means and to said transducer for receiving echo signals and blocking passage thereof for a predetermined time following said trigger signal greater than the time for said echo signal to be received from said target, first flip-flop means connected to said trigger signal producing means and to said blanking circuit for shifting from a first to a second output condition when said trigger signal is received and from said second to said first condition when an echo signal is passed by said blanking circuit, a second flip-flop connected to the output of said first flip-flop and to said logic means for shifting from a first to second output condition when said first flip-flop shifts from said first to second condition and from said second to said first condition when said logic circuit produces said given output condition at said second output, and gate means connected to the output of said second flip-flop and to the output of said circuit means for passing pulses from said circuit means while said second flip-flop is in said first condition.

15. A circuit as in claim 14 further including a blanking circuit connected to said trigger signal producing means, to said transducer and to said logic circuit for receiving echo signals and blocking passage thereto to said logic circuit for a predetermined time following said trigger signal less than the time for said echo signal to be received from said target.

16. A circuit as in claim 15 further including a serially connected filter circuit, amplifier circuit and threshold detector circuit connected between said blanking circuits and said transducer.

17. A circuit as in claim 16 wherein each said blanking circuit includes a one-shot multivibrator connected to said trigger signal producing means for producing a pulse in response to said trigger signal and gate means connected to said one-shot multivibrator and to said threshold detector circuit for blocking passage of an echo signal while said one shot multivibrator is producing a pulse.

18. A method of determining the level of a liquid comprising the steps of:
directing from above the liquid surface an acoustical pulse toward the surface of said liquid and toward a calibration target, said calibration target being constructed so as to allow expansion of said pulse so that an echo signal produced exhibits a reverse wave shape from an echo signal received from said liquid, said target disposed between the point of transmission and the liquid surface,
detecting the echo signals received successively from said target and the surface of said liquid,
determining a first time between receipt of said echo signal from said target and when the acoustical pulse is directed, determining a second time between receipt of said echo signal from said liquid surface and when the acoustical pulse is directed, comparing the first time with a calibration time and producing an output indication signal as a function of the first time and the comparison.

19. A method as in claim 18 further including the steps of:

producing a train of electrical pulses, wherein the comparing comprises comparing a first time interval between transmission of the acoustical pulse and receipt of the echo signal from the target with a second time interval required to count a predetermined number of pulses, varying the frequency of said pulse train as a function of the difference between the said first time interval and the said second time interval and which time interval is greater so as to reduce the difference, and counting the pulses produced between receipt of the echo signal from said target and receipt of the echo signal from the liquid surface.

20. A method as in claim 19 including the further step of displaying the counted pulses.

21. A method as in claim 19 wherein said step of comparing includes the steps of counting a predetermined number of pulses following transmission of the acoustical pulse and producing a given signal upon reaching a count of said predetermined number.

22. A method as in claim 19 wherein said step of varying includes the step of controlling the voltage input to a voltage controlled oscillator.

23. A method as in claim 19 including the further steps of producing a trigger signal synchronized with the electrical pulses, and applying said trigger signal to a transducer to produce said acoustical pulse.

24. A method as in claim 18 wherein said step of directing includes the step of directing said acoustical pulse in a tube having said target therein.

* * * * *